United States Patent [19]
Fiard et al.

[11] Patent Number: 5,476,707
[45] Date of Patent: Dec. 19, 1995

[54] COMPOSITE POLYESTER FILMS SUITABLE IN PARTICULAR AS SUPPORTS FOR MAGNETIC RECORDING MATERIALS, AND MAGNETIC RECORDING MATERIALS THUS PRODUCED

[75] Inventors: Jean-Francois Fiard, Paris; Etienne Fleury, Lyons; Dominique Gerwig, Montluel; Sylvianne Traversier, Caluire; Louis Vovelle, Lyons, all of France

[73] Assignee: Rhone-Poulenc Films, Courbevoie Cedex, France

[21] Appl. No.: 247,114

[22] Filed: May 20, 1994

Related U.S. Application Data

[63] Continuation of Ser. No. 688,584, filed as PCT/FR89/00684, Dec. 27, 1989, abandoned.

[30] Foreign Application Priority Data

Dec. 28, 1988 [FR] France ................................ 88 17560

[51] Int. Cl.[6] ........................... B32B 5/16; B05D 5/12
[52] U.S. Cl. ................... 428/141; 427/127; 427/128; 427/487; 428/327; 428/335; 428/336; 428/337; 428/341; 428/483; 428/694 BB; 428/694 BP; 428/694 BR; 428/910
[58] Field of Search ...................... 428/480, 327, 428/336, 341, 504, 506, 694 BB, 694 BP, 694 BR, 335, 337, 141, 483, 910; 427/487, 127, 128, 523, 531, 131, 502; 264/164, 291

[56] References Cited

U.S. PATENT DOCUMENTS

| | | | |
|---|---|---|---|
| 4,320,207 | 3/1982 | Watanabe et al. | 521/54 |
| 4,568,616 | 2/1986 | Seifried et al. | 428/480 |
| 4,619,869 | 10/1986 | Kiriyama et al. | 428/480 |
| 4,681,815 | 7/1987 | Rutkiewis et al. | 428/458 |
| 4,876,137 | 10/1989 | Utsumi | 428/141 |
| 4,880,700 | 11/1989 | Charmot et al. | 428/337 |
| 4,883,706 | 11/1989 | Grosjean | 428/215 |
| 4,908,277 | 3/1990 | Tsunashima et al. | 428/480 |
| 5,039,339 | 8/1991 | Phan et al. | 428/481 |
| 5,069,962 | 12/1991 | Okazaki et al. | 428/323 |
| 5,100,719 | 3/1992 | Endo et al. | 428/213 |
| 5,128,260 | 7/1992 | Fiard et al. | 428/337 |

*Primary Examiner*—D. S. Nakarani
*Assistant Examiner*—H. Thi Lê
*Attorney, Agent, or Firm*—Burns, Doane, Swecker & Mathis

[57] ABSTRACT

The invention relates to composite films consisting of a semicrystalline polyester substrate film, free from filler and with a roughness Ra lower than or equal to 0.01 μm, carrying on at least one of its faces a coating based on a modified polymer obtained by polymerization of one or more acrylic monomers in the presence of a water-dispersible sulphonated copolyester.

32 Claims, No Drawings

COMPOSITE POLYESTER FILMS SUITABLE IN PARTICULAR AS SUPPORTS FOR MAGNETIC RECORDING MATERIALS, AND MAGNETIC RECORDING MATERIALS THUS PRODUCED

This application is a continuation of application Ser. No. 07/688,584, filed as PCT/FR89/00684, Dec. 27, 1989, now abandoned.

The present invention relates to smooth-faced composite polyester films intended to receive particularly a magnetic coating and to magnetic recording materials resulting therefrom.

Because of their mechanical and chemical properties, polyester films constitute a material of quality as a substrate for magnetic recording coatings (metal oxides or metal alloys). However, polyester films lack slip, and this gives rise to difficulties in application and in particular in reeling, due to a high friction coefficient of the films sliding over themselves or over stationary or moving smooth metal surfaces such as those present in film manufacturing units (rollers, rolls) or in equipment for reproducing recorded signals. The most widely employed means of solving the problem presented by the absence of slip in polyester films consists in imparting to them a surface roughness by incorporation of inert particles of metal salts or oxides, which give rise to asperities on the film surface. While in the case of many applications the presence of these asperities presents no problems, this is not so in the field of magnetic film.

In fact, surface irregularities of the substrate film are reflected in surface irregularities in the magnetic coating and even in a discontinuity of this coating, which give rise to a loss of data when recording and/or when reading the data. Furthermore, the abrasion of these asperities during repeated uses of the magnetic films also contributes to their deterioration. To solve these problems it has been necessary to reach a compromise between the slip properties and the surface roughness of the films through the choice of the quantities of fillers to be used and of their particle sizes. Many solutions have been proposed which have been found satisfactory for obtaining films for magnetic recording of sounds or images (video films), in which the magnetic coating is produced by depositing a magnetic coat. In this case, the thickness of the magnetic layer is generally sufficient to attenuate the surface topography of the substrate film. On the other hand, these solutions quickly come up against their limits when it is a question of manufacturing films for magnetic recording of high-density data, in which the magnetic coating formed by evaporation of metal oxides or alloys or by cathodic coating (sputtering) is extremely thin: usually between 0.01 and 0.2 µm. In fact, in this case it is appropriate to resort to films whose face receiving the magnetic coating (referred to as the ventral face hereinafter) must be practically smooth, that is to say has a roughness Ra, as will be defined below, lower than or equal to 0.01 µm. It then becomes difficult to reel the film because of the increase in its friction coefficient. In conclusion, in the case of magnetic films with high-density data it becomes difficult or even impossible to reconcile good machinability properties with good data recording and retrievable properties by incorporating solid particles in the substrate film, the improvement in each of these properties being obtained at the cost of the others. To try and solve this problem it has been proposed to make use of substrate films which have a smooth ventral face and a rough opposite face, referred to as the dorsal face hereinafter. Such films can be obtained by coextrusion of a polyester which is free from fillers and of a polyester containing inorganic fillers, or by deposition, using in-line or out-of-line coating, of coating compositions containing inorganic fillers. Nevertheless, it has been found that when the roughness of the dorsal face is due to the presence of hard particles (inorganic particles) in the polymer, the magnetic layer is damaged by the adjacent rough dorsal face during storage on reel, the irregularities of this face being imprinted into the magnetic layer. Consequently industry is still searching for a means making it possible to impart to a substrate polyester film in particular for magnetic coating, a low surface roughness, a good slip and good abrasion resistance at the same time, suitable particularly for the manufacture of materials for high-density magnetic recording. The present invention sets out to answer precisely this need.

More specifically, the first objective of the present invention is the development of composite polyester films whose ventral face is smooth, that is to say free from protuberances or peaks due to the presence of fillers, and whose dorsal face simultaneously exhibits low friction coefficients.

A second objective of the invention is aimed at obtaining composite polyester films whose dorsal face has an excellent abrasion resistance.

A third objective of the invention is aimed at imparting good reelability and machinability properties to composite polyester films with a smooth ventral face, without the dorsal face generating faults on the magnetic layer of a recording material employing the said films as substrates.

More specifically, the objective of the present invention is the development of polyester films exhibiting at the same time a roughness of the ventral face Ra, as will be defined later, which is lower than or equal to 0.01 µm, film/metal friction coefficients, as will be defined later, which are lower than or equal to 0.5 and a good abrasion resistance.

These various objectives are obtained by deposition on at least one of the faces of a semicrystalline oriented polyester film of a specific coating intended to improve the surface properties of the said films.

More precisely, the first subject of the present invention is composite polyester films capable of being employed particularly as a substrate for a magnetic coating, consisting of an oriented polyester film at least one of whose faces comprises a coating intended to impart a good slip and a good abrasion resistance to it, characterised in that the oriented polyester film, free from inorganic particles, has smooth faces and has a roughness Ra lower than or equal to 0.01 µm and that the said coating consists of a modified polymer obtained by aqueous-phase radical polymerisation of at least one monomer of acrylic nature in the presence of an effective quantity of a water-dispersible polyester derived from at least one dicarboxylic aromatic acid and from at least one aliphatic diol and containing a plurality of sulphonyloxy groups of general formula:

$(-SO_3-)_nM$          (I)

in which n is equal to 1 or 2, and

M denotes a hydrogen atom, an alkali or alkaline-earth metal, an ammonium cation or a quaternary ammonium cation.

For the purpose of the present application, "water-dispersible polyesters" refers to water-soluble polyesters or polyesters forming stable dispersions in water. "Polyester films free from inorganic particles" refers to films in which no filler has been added and which contain no inorganic components other than the residues of the catalysts employed during the transesterification and polycondensation stages during the preparation of the polyester.

The Applicant Company has unexpectedly found that the modified polymers obtained by polymerisation of at least one monomer of acrylic nature in the presence of a sulphonated polyester impart good slip properties to smooth, filler-free polyester films, and consequently good machinability and, in particular, good reelability. It has also been found that the coating in accordance with the invention exhibits a good abrasion resistance. These composite films are therefore very particularly suitable as a substrate for magnetic coating and, in particular, for magnetic coating camping high-density data, such as those obtained by metal evaporation or cathode sputtering.

A second subject of the present invention consequently lies in a magnetic recording material comprising an oriented polyester film with a roughness Ra lower than or equal to 0.01 μm, a magnetic coating and, on at least one of its faces, a coating intended to impart a good slip and a good abrasion resistance to the whole, characterised in that the said coating consists of a modified polymer obtained by aqueous-phase radical polymerisation of at least one monomer of acrylic nature in the presence of an effective quantity of a water-dispersible polyester derived from at least one dicarboxylic aromatic acid and from at least one aliphatic diol and containing a plurality of sulphonyloxy groups of general formula:

$$(-SO_3-)_nM \qquad (I)$$

in which:

n is equal to 1 or 2, and

M denotes a hydrogen atom, an alkali or alkaline-earth metal, an ammonium cation or a quaternary ammonium cation.

The oriented polyester films employed as a substrate for the modified polymer coating in the composite films according to the present invention are those usually employed as substrates for the manufacture of magnetic materials. They consist of polyesters resulting from the polycondensation of one or more dicarboxylic aromatic acids (or their derivatives) such as terephthalic, isophthalic or 2,6-naphthalenedicarboxylic acids with one or more alkylene glycols (ethylene glycol, 1,3-propylene glycol, 1,4-butanediol). Minor quantities of aliphatic dicarboxylic acids (for example adipic acid) or of cyclohexanedicarboxylic acids or of diols such as di-or trioxyalkylene glycol, branched aliphatic diols (neopentyl glycol) or 1,4-cyclohexanedimethanol may be used in combination with the basic diacids and diols. In general, these compounds represent not more than 20 mol % of the latter materials. Use is preferably made of polyesters containing at least 80 mol % of units derived from at least one aromatic dicarboxylic acid and from ethylene glycol and, more preferably, at least 80 mol % of ethylene terephthalate or naphthalenedicarboxylate units. As examples of polyesters which are preferably employed as substrates there may be mentioned the polyterephthalate of ethylene glycol, the polyterephthalate of 1,4-butanediol and the poly-2,6-naphthalenedicarboxylate of ethylene glycol.

The oriented polyester substrate films are obtained in a traditional manner by extrusion of a sheet of amorphous polyester, cooling of this sheet, drawing in one or two perpendicular directions, heat-setting and, if appropriate, treatments intended to give balanced or "overdrawn" films.

In order to produce the composite films in accordance with the present invention, use is preferably made of oriented polyester films exhibiting a roughness Ra lower than or equal to 0.01 μm (the roughness Ra is measured according to DIN Standard 4,768 in conditions which will be specified later) and a thickness lower than or equal to 40 μm and preferably of between 5 and 35 μm.

The modified polymers employed to produce the coating of the composite films according to the invention are known products obtained by radical polymerisations in aqueous media of at least one acrylic monomer in the presence of a water-dispersible polyester containing sulphonyloxy groups. Such modified polymers and a process for obtaining them have been described particularly in European Patent Application 0,260,203.

The water-dispersible polyesters containing sulphonyloxy groups are known products, described particularly in French Patents No. 1,401,581 and 1,602,002 and European Patent Application No. 0,129,674; for the purpose of the present invention, the polyesters containing sulphonyloxy groups described in these patents may be resorted to. More specifically, the water-dispersible polyesters are obtained by polycondensation of one or more dicarboxylic aromatic acids with at least one or more aliphatic diols and at least one difunctional compound containing at least one sulphonyloxy group; in what follows, for convenience of description, the expression "sulphonyloxy group" will refer both to the hydroxysulphonyl groups and the alkali or alkaline-earth metal or ammonium salts derived therefrom.

Among the dicarboxylic aromatic acids which can be employed for preparing the water-dispersible polyesters there may be mentioned, by way of nonlimiting examples: terephthalic, isophthalic, phthalic, 1,4-naphthalenedicarboxylic and 4,4'-oxydibenzoic acids, bis(4-hydroxycarbonylphenyl) sulphone and 4,4'-di(hydroxycarbonyl)benzophenone. These acids may be employed by themselves or mixed.

Among the abovementioned acids, those preferably used are terephthalic and isophthalic acids, by themselves or in combination with the other acids mentioned. Mixtures of terephthalic acid with one or more other aromatic dicarboxylic acids and, in particular, with isophthalic acid are very particularly suitable for obtaining water-dispersible sulphonated polyesters. In this case, the quantity of terephthalic acid, expressed in moles, may vary between 20 and 99%, and preferably between 30 and 95%, of the total number of moles of unsulphonated diacids.

For preparing dispersible copolyesters, aliphatic dicarboxylic acids containing from 3 to 15 carbon atoms may be used in combination with the aromatic diacids. More particularly, all or part of the aromatic acid employed together with terephthalic acid (for example isophthalic acid) may be replaced by aliphatic acids such as adipic, suberic, sebacic, succinic or dodecanedioic acids.

For preparing water-dispersible sulphonated polyesters, the dicarboxylic acids may be replaced during the polycondensation by their derivatives which are usually employed in this type of reactions acid anhydrides, esters or chlorides. Esters and, in particular, methyl esters are preferably used.

As an example of diols which can be employed for preparing water-dispersible sulphonated polyesters there may be mentioned ethylene glycol, 1,2-butanediol, 2,2-dimethyl-1,3-propanediol, 1,5-pentanediol, 1,6-hexanediol, diethylene glycol, triethylene glycol, neopentyl glycol, cyclohexanedimethanol, tetraethylene glycol and penta-, hexa- or decamethylene glycols. Ethylene glycol and its oligomers are very particularly suitable for preparing sulphonated polyesters. They may be employed by themselves or mixed with each other and/or with other diols. Mixtures of ethylene glycol and of its oligomers of formula HO—(CH$_2$—CH$_2$—O—)$_n$H in which n is an integer from 2 to 10 are preferred.

The sulphonyloxy groups of formula —SO₃M are introduced into the polyester by means of a difunctional compound containing a sulphonyloxy group, capable of reacting with diacids and/or diols during the polycondensation. Examples of such monomers are mentioned in French Patent No. 1,602,002. Use is preferably made of alkali metal salts of dicarboxylic aromatic acids containing sulphonyloxy groups, such as those of sulphoisophthalic, sulphophthalic, 4-hydroxysulphonyl or 2,7-naphthalenedicarboxylic acids or of their derivatives and, in particular, of their esters. The quantity of difunctional compound containing the sulphonyloxy group which is present in the sulphonated polyester, expressed in moles per a total of 100 moles of difunctional compound of the same kind, is preferably between 4 mol % and 30 mol %. In general, quantities of sulphonated difunctional compound which are between 5 moles and 20 moles per a total of 100 moles of difunctional compound of the same kind are suitable. Thus, when an alkali metal salt of 5-hydroxysulphonylisophthalic acid is used, this compound may represent from 4 moles to 30 moles per a total of 100 moles of dicarboxylic acid units present in the polyester.

Among the copolyesters containing sulphonyloxy groups described above use is preferably made of those which have a glass transition temperature higher than or equal to 20° C. when measured at a relative humidity of 65%.

The water-dispersible polyesters described above are obtained by the usual processes, for example by reaction of diol(s) with a mixture of methyl esters of the various necessary acids, in the presence of the usual transesterification catalysts, followed by polycondensation of the diol esters thus obtained. The quantities of each of the reactants are calculated so that the ratio of the total number of alcoholic hydroxyl groups to the total number of carboxylic groups is preferably between 2 and 2.5.

The acrylic monomers which are used for the preparation of the modified polymers may be denoted by the general formula:

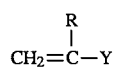

(II)

in which:

R denotes a hydrogen atom or a lower alkyl group, optionally substituted by a hydroxyl group;

Y denotes a hydroxycarbonyl functional group, alkoxycarbonyl of formula —COOR₁ in which R₁ is an alkyl radical containing from 1 to 20 carbon atoms, linear or branched (optionally substituted by a hydroxyl residue), nitrile, amide of formula —CON(R₂R₃) in which R₂ and R₃, which are identical or different, denote a hydrogen atom or a linear or branched alkyl residue containing from 1 to 20 carbon atoms.

A lower alkyl radical refers to alkyl radicals containing from 1 to 4 carbon atoms.

Specific examples of radicals R₁, R₂ and R₃ which may be mentioned are methyl, ethyl, n-propyl, isopropyl, n-butyl, isobutyl, tert-butyl, n-pentyl, n-hexyl, 2-ethylhexyl, decyl, dodecyl and octadecyl radicals. Examples of hydroxyalkyl radicals R₁ which may be mentioned are hydroxymethyl, 2-hydroxyethyl, 3-hydroxypropyl and 4-hydroxybutyl radicals.

In formula (II) R preferably denotes a hydrogen atom or methyl or hydroxymethyl radicals.

Among the acrylic derivatives of formula (I) which may be used for preparing the modified polymers there may be mentioned, no limitation being implied: acrylic acid, methacrylic acid, acrylonitrile, methacrylonitrile, acrylamide, methacrylamide, N-methylacrylamide and methyl, ethyl, n-propyl, isopropyl, n-butyl, isobutyl, 2-ethylhexyl and stearyl acrylates and methacrylates. These monomers can be employed by themselves or as mixtures of two or more than two acrylic derivatives. Mixtures which may be mentioned as examples of combinations of acrylic derivatives are: methyl methacrylate/acrylic and/or methacylic acid, methyl methacrylate/acrylic or methacrylic acid/ethylacrylate, methyl methacrylate/ethyl acrylate/acrylamide or methacrylamide, acrylamide/methacrylamide, butyl acrylate/acrylic acid, and butyl methacrylate/ethyl acrylate.

The acrylic compounds may furthermore be combined with a minor quantity of one or more ethylenic monomers such as vinyl acetate, vinylidene chloride, styrene, methylstyrene, crotonic, itaconic, fumaric or maleic acids or alkali or alkaline-earth metal salts of ethylenic sulphonic acids such as vinylsulphonic, allylsulphonic, methallylsulphonic and styrenesulphonic acids. The quantity of nonacrylic ethylenic monomer is calculated so that the number of repeat units of this nonacrylic monomer in the copolymer obtained, expressed in moles per 100 moles of acrylic monomer is preferably lower than or equal to 20% and, still more preferably, 10%. Quantities of ethylenic units representing from 0.1 to 5 mol % are suitable.

These monomers may, without departing from the scope of the present invention, be combined with one or more monomers capable of producing crosslinking of the acrylic part. To this end, it is possible to use polyethylenic monomers capable of being crosslinked under the action of free radical generators during the polymerisation or else monomers producing crosslinking of the acrylic part on heating, for example during the process of obtaining the coated film or during a subsequent heat treatment of the coated film. Examples of polyethylenic monomers which may be mentioned are diallyl phthalate, divinylbenzene and diacrylates or dimethacrylates of diols, such as ethylene glycol dimethacrylate. Hydroxyalkyl (meth)acrylamides such as N-methylolacrylamide and N-methylolmethacrylamide are suitable as heat-activated crosslinking agents.

The quantity of crosslinking monomer, expressed as above, is preferably lower than 5 moles per 100 moles of noncrosslinking acrylic monomer. It is generally between 0.1 and 3 mol %.

To prepare the modified polymers, the operation is carried out according to the usual techniques of radical polymerisation of ethylenically unsaturated monomers in aqueous phase. The polymerisation is generally carried out by dispersing the acrylic monomer(s) in a suitable volume of water into which is introduced the necessary quantity of a dispersible sulphonated polyester and, where appropriate, one or more conventional emulsifying agents. In fact, although the sulphonated polyester can itself act as the emulsifier enabling the monomer(s) to disperse in water, this does not rule out the use of the usual surface-active agents such as, for example, alkali metal salts of long-chain alcohol sulphates (sodium laurylsulphate, ethanolamine laurylsulphate), alkali metal salts of long-chain sulphonic acids, nonionic emulsifiers such as polyoxyethylene glycols and their derivatives, or optionally sulphated alkoxylated alkylphenols. The operation is preferably carried out in the presence of 0.1 to 2% by weight, based on the total of copolyester/polymerisable monomers, of a surface-active agent. The polymerisation is initiated with the aid of the usual free radical generators such as peroxide compounds: persulphates, hydrogen peroxide, organic peroxides (lauroyl and benzoyl peroxides, t-butyl hydroperoxide), azo compounds (azodiisobutyronitrile) or redox systems using a combination of a peroxidic compound, preferably water-soluble, and a reducing agent: ferrous salts (sulphate), and alkali metal sulphites or bisulphites.

Other usual polymerisation adjuvants may be present in the reaction mixture. Thus, the operation may be carried out in the presence of a conventional chain-limiting agent such as mercaptans (dodecyl mercaptan, tetradecyl mercaptan), so as to regulate the molecular weight of the copolymer obtained as a function of the desired coating properties.

The temperature at which the polymerisation is conducted can vary within wide limits. A temperature of between 10° and 100° C. and preferably between 20° and 80° C. is generally suitable.

Study of the product resulting from the polymerisation of at least one acrylic monomer such as defined above, in the presence of a dispersible polyester, has made it possible to establish that the polyester is chemically bonded to the acrylic polymer. Without restricting the invention in any way whatsoever to a particular reaction mechanism, it appears that the polyester and the acrylic monomer(s) react during the polymerisation to form a graft copolymer.

To obtain the composite films according to the invention, it is preferable that the dispersible polyester should represent at least 5% by weight and preferably at least 10% by weight of the total dispersible polyester/acrylic (co)polymer in the product resulting from the polymerisation. The presence of dispersible polyester which is not chemically bonded and/or of free acrylic (co)polymer is not prejudicial to the application of the process; it is therefore unnecessary to remove them from the emulsion obtained. The quantity of dispersible polyester can vary within wide limits. In general, this quantity may represent up to 60% by weight of the dispersible polymer/acrylic (co)polymer total. A quantity of dispersible polyester of between 10 and 45% by weight is suitable.

It has been found that the abrasion resistance of the coating depends to some extent on the concentration of sulphonated copolyester in the modified polymer and, everything else being equal, the abrasion resistance of the coating increases when this concentration increases. The optimum concentration is chosen by taking into consideration the value of the glass transition temperature of the acrylic part of the modified polymer, as defined later, which exerts an effect on the friction coefficient of the film and on the abrasion resistance of the coating. Generally speaking it is preferable to increase the content of sulphonated copolyester in the modified polymer when the glass transition temperature of the acrylic part of the modified polymer increases. The optimum concentration can be easily determined by means of simple tests in each particular case.

The concentration of the dispersible polyester and of the polymerisable monomer(s) in the aqueous phase of polymerisation is not critical and can vary within wide limits. This concentration is chosen as a function of the desired solids content of the final emulsion and of the degree of polymerisation of the monomer(s) under the conditions of polymerisation.

The aqueous product obtained after polymerisation can be used directly for making use of the process according to the invention. It can equally be subjected to various treatments. Thus, the unconverted monomers may be removed by the usual means at the end of the polymerisation. When one or more of the reaction components contains free acidic functional groups, the latter may be neutralised by adding an inorganic or organic base; an alkaline base (sodium hydroxide, potassium hydroxide), quaternary ammonium hydroxide or aqueous ammonia is preferably used. Sulphonic acid functional groups of the dispersible polyester and/or carboxylic acid functional groups of the acrylic (co)polymer may be involved. Adjuvants such as stabilisers or antistatic agents may also be added to the emulsion obtained. According to a variant, known external crosslinking agents for acrylic (co)polymers may also be introduced into the emulsion obtained.

The nature of the crosslinking agents depends on the nature of the acrylic monomer(s). Among the preferred crosslinking agents there may be mentioned phenol-formaldehyde resins and amine-formaldehyde resins, such as the products of melamine/formaldehyde, urea/formaldehyde or triazine/formaldehyde condensation. The quantity of crosslinking agent is then generally between 0.1 and 15% by weight and preferably between 0.5 and 12% by weight, relative to the total weight of the dispersible polyester and of the acrylic (co)polymer which are present in the emulsion.

The product resulting from the polymerisation takes various forms, depending on the proportion and the nature of the reactants used and/or the polymerisation conditions and/or the final treatment applied to the product obtained. Thus, the products resulting from the polymerisation of a nonacidic acrylic monomer with a considerable quantity of a polymerisable acid ((meth)acrylic acid, crotonic acid), for example at least 5 mol % of the total of the polymerisable monomers can take the form of a true emulsion when the carboxylic acid groups are free or in the form of more or less viscous aqueous solutions when the carboxylic groups are neutralised using one of the bases referred to earlier and in particular using an alkaline base. The viscosity of the dispersions or solutions of modified polymers is not critical and may be adjusted at will as needed by modification of their solids content.

Among the modified copolymers employed for obtaining the composite films in accordance with the present invention, use is preferably made of those in which the acrylic part has a composition such that the said part would produce a free acrylic (co)polymer which has a glass transition temperature of between approximately 0° C. and approximately 100° C. and preferably between 0° and 80° C. and still more preferably between 20° and 70° C.

It has been established, in fact, that the static and dynamic film/film and film/metal friction coefficients decrease with an increase in the glass transition temperature (Tg) of the acrylic part, up to a limiting value. It has also been established that the abrasion resistance increases with a decrease in the Tg of the acrylic part of the modified copolymer. The latter is therefore chosen to produce the best friction coefficient/abrasion resistance compromise. Modified copolymers whose Tg of the acrylic part is chosen as a function of the temperature of use of the substrate film obtained and of the property which it is intended to promote are generally called for; the Tg may depart more or less from this temperature of use; it is generally situated in a range which is between 20° C. below the temperature of use of the film and 60° C. above this temperature. To benefit from the advantageous effect of a high Tg (in particular one higher than 20° C.) of the acrylic part on the friction coefficients and to compensate for the detrimental effect of such an increase on the abrasion resistance of the coating it is possible, as has been indicated above, to increase the concentration of copolyester containing sulphonyloxy groups. Thus, in the case of Tg values of the acrylic part which are close to (or higher than) the temperature of use of the films, and in particular in the case of Tg values higher than or equal to 20° C., it is preferable to resort to modified polymers containing at least 20% by weight of sulphonated copolyester, and preferably at least 25%.

It is possible, however, to obtain relatively low friction coefficients without resorting to excessively high Tg values of the acrylic part, by modifying the viscoelastic properties of the modified polymer. A result of this kind can be obtained especially by crosslinking the acrylic part using the internal or external crosslinking agents described earlier. The suitable degree of crosslinking will be easily determined by the specialist in each particular case as a function of the composition of the polymerisable part.

According to another variant it is possible to employ modified polymers whose acrylic part has a low Tg, especially lower than 20° C. and consequently to obtain the benefit of the good abrasion resistance properties of the coating, by incorporating into the modified polymer polymeric fillers in the form of substantially spherical particles which are not capable of damaging the magnetic coating deposited subsequently on the other face of the substrate film when a dorsal face is in contact with a ventral face; this makes it possible to obtain a reduction in the friction coefficients of the coating without increasing the roughness of the ventral face intended to receive the magnetic coating, without unfavourably increasing the roughness of the film obtained.

The filler used is substantially spherical particles of hydrocarbon polymers such as polyolefins (polyethylene, polypropylene), polystyrene, crosslinked copolymers of styrene with a polyethylenic monomer (for example divinylbenzene), or of acrylic polymers such as preferably crosslinked alkyl polyacrylates and methacrylates (for example polymethyl methacrylate crosslinked with ethylene glycol dimethacrylate).

The spherical particles of polymer have a mean diameter of less than 0.2 μm and preferably between 0.05 μm and 0.15 μm.

A mean particle diameter refers to the mean diameter of the particle size distribution, determined by scanning electron microscopy before their application. These particles are free from spheres with a diameter of more than 1 μm.

The quantity of polymer spheres which are introduced into the modified polymer depends on the glass transition temperature of the latter. It is calculated to impart to the dorsal layer both a friction coefficient and a total roughness which are sufficiently low. The quantity of spherical particles generally represents at most 8% by weight of the modified polymer and preferably between 0.5% and 5% by weight.

The deposition of the coating onto the polyester film may be carried out by the various techniques known to the specialist. Thus, the aqueous polymer solution or emulsion may be deposited by gravity from a slot caster, or by passing the film through the emulsion or solution, or else by means of transfer rolls. The thickness of the layer is controlled by any appropriate means. The deposition of the coating may take place either before any film drawing (in-line coating), or after drawing, before or after heat-setting (out-of-line coating). It is preferred, however, to coat the polyester film before drawing or between two drawing operations.

Before the coating operation, the polyester film may be subjected to a surface treatment chosen from those usually employed and, more particularly, from physical treatments. Thus, the face intended to receive the coating may be subjected to electrical discharges (corona treatment) or to ionising radiations. However, such treatments are not indispensable.

The quantity of aqueous coating composition deposited onto the film depends, on the one hand, on its solids content and, on the other hand, on the desired thickness of the coating in the finished film, that is to say after drawing and heat-setting when the coating operation takes place in line. This quantity also depends on the time of the coating operation; the change in the thickness of the coating before and after drawing must obviously be allowed for when the coating operation is performed before drawing. The thickness of the finished coating may vary within wide limits. It has been established, however, that the friction coefficient increases up to a certain limit with the thickness of the coating and that it is consequently not to be recommended that the dorsal coating should have a thickness of more than 1 μm. On the other hand, if the coating thickness is too low, the composite polyester film becomes difficult to reel as a result of the irregularity of the coating. In these conditions it is preferable that the thickness of the modified polymer coating be greater than or equal to 0.05 μm and smaller than 0.7 μm. It is preferably within a range of 0.1 to 0.5 μm.

After being coated, the polyester film is heat-treated to remove the water present in the coating and, where appropriate, to produce the crosslinking of the polymer. In the case of in-line coating it is generally unnecessary to apply a heat treatment; the drying and the optional crosslinking are carried out during the drawing and the heat-setting. However, it would not constitute a departure from the scope of the present invention to apply, in this case, a sufficient heat treatment to produce coalescence of the latex and drying, before the drawing and the heat-setting.

The modified polymer coating may be applied onto only one of the faces or onto both faces of the smooth polyester substrate film. In this latter case the coating situated on the face intended to receive the final coating and, in particular, the magnetic coating, contributes to improving its adhesiveness to the substrate. In this last case it is preferable that the coating should be free from filler.

The production of magnetic recording films in accordance with the invention is carried out by depositing a magnetic substance onto one face of the composite polyester films, using known processes. Although it is possible to make use of a coating operation using a magnetic coating consisting of a ferromagnetic substance such as iron, nickel, cobalt or chromium oxides or their mixtures, dispersed in a polymeric binder, the polyester films in accordance with the invention are very particularly suitable for obtaining high-density data films by deposition of a thin magnetic coating by the metal evaporation or ionic metallisation techniques. Before the deposition of the magnetic coating, the composite polyester film may be subjected to various treatments to improve its properties. Thus, it may be subjected to a corona treatment to increase its properties of adhesion to the magnetic coating. A layer of an adhesive primer may also be applied to it for the same purpose. To this end, use may be made of the numerous compositions described in the literature and well known to the specialist. However, it turns out to be particularly simple to make use of the aqueous solutions or dispersions of sulphonated polyesters modified with acrylic monomers and described above, in accordance with the teaching of European Patent Application 0,260,203.

It is possible to use for this purpose a composite film in accordance with the invention, comprising a modified copolymer layer on each of its faces, the layer present on the face intended to receive the magnetic coating (ventral face) acting as an adhesive primer and the layer present on the opposite face (dorsal face) ensuring the machinability of the magnetic tape. The composition of the coating of the ventral or dorsal faces may be identical or different. Thus, the coating of the ventral layer may be free from filler or the acrylic part and/or the sulphonated copolyester part may differ in their composition on each face.

When only one face of the composite film comprises the modified copolymer coating, the magnetic coating is preferably deposited onto the opposite face, which becomes the ventral face of the magnetic tape. However, it would not constitute a departure from the scope of the present invention to deposit the magnetic coating onto the modified copolymer coating.

Although the composite films are very particularly suitable for obtaining magnetic tapes, they can be employed as a substrate for other final coatings which make it necessary to resort to substrates of low roughness.

The magnetic films thus obtained may then be converted into magnetic recording materials such as tapes or disks by means of the usual techniques.

The following examples illustrate the invention and show how it can be put into practice. In these examples, the following properties of the composite films have been determined:

1) Roughness values
   a) Arithmetic mean deviation: Ra (or CLA) roughness
   This characteristic, defined in DIN Standard 4768 was measured in a Perthen S6P apparatus in accordance with the method described in this standard, under the following conditions:

cut-off wavelength value: 0.08 mm, sensing length: 1.75 mm, radius of curvature of the sensor: 5 µm, pressure force on the sensor: 50 mg f The result taken is the mean of 30 measurements performed on profiles 20 µm apart.

b) Maximum height of the surface peaks: MH
   The maximum height of the surface peaks was determined by interferometry according to Nomarski, in white light. A Nachet NS 400 microscope equipped with a Nomarski interferometer and with an objective which had a magnification of 80 was employed for this purpose.

c) Optical three-dimensional roughness SRa and SRz.
   The SRa roughness represents the arithmetical mean deviation of the surface roughness relative to the mean plane, expressed in µm (this is the extension of the Ra roughness to a surface).

The SRz roughness is the distance between two parallel mean planes:
   an upper mean plane defined by the mean of the five highest peaks;
   a lower mean plane defined by the mean of the five deepest valleys.

The SRa and SRz roughness values were determined by means of a Surfcorder ET-30 HK apparatus recovered from the SPA 11 treatment unit from Kosaka Laboratories Ltd and of a Hiposs optical type sensor, under the following conditions:

cut-off wavelength—0.08 mm magnification: 20,000× sensing speed: 20 µm/s sensing length: 0.25 mm with a 0.5 µm sampling step number of profiles 150 with a 0.5 µm step between profiles surface tested: 0.25 mm×0.075 mm gain: 1 hysteresis: 1

2) Friction coefficients
   a) Film on film: µs and µd

The static friction coefficient (µs) when starting and the dynamic friction coefficient (µd) when running a film moving over another film are measured in accordance with ASTM Standard D 1894.78 in a Davenport apparatus under the following conditions:

| contact area | 6.3 × 6.3 cm |
|---|---|
| tape tension | 200 g |
| pressure | 5 g/cm² |
| speed | 15 cm/min |
| stressed length | 13 cm | b) Film on metal: µk

The measurement of µk was carried out according to the method described on page 11 paragraph 3 of European Patent Application 0 66,997 under the following conditions:

| diameter of the stationary roller | 10 mm |
|---|---|
| tape width | 2.5 cm |
| speed of travel | 5 m/min |
| tape tension | 200 g |
| period | 20 min |
| temperature | 25° C. |
| relative humidity | 35% |
| contact area | 5 cm² |
| winding angle on the roller | 205° | c) Film/metal static (µs) and dynamic (µd) friction coefficients

These were determined according to the so-called "shoeshine" method described in Japanese Patent Application J 63/28,627, using an apparatus similar to that described in the said application, with the following conditions:

| roller diameter | 6 mm |
|---|---|
| tape width | 1.27 cm |
| speed of travel | 0.9 m/min |
| tension | 50 g |
| period | 15 min |
| temperature | 25° C. |
| relative humidity | 35% |
| contact area | 1.27 × 0.7 cm² |

The shear stress frequency is of the order of 1 Hz.

In what follows, Tg(A) will denote the glass transition temperature of the free acrylic copolymer.

EXAMPLE 1

1) Preparation of a modified sulphonated copolyester.

Using the process described in Example 1 of European Patent Application No. 0,260,203, a modified sulphonated copolyester was prepared by polymerisation in aqueous medium of a mixture of methyl methacrylate (MMA), ethyl acrylate (EA), methacrylic acid (MAA), sodium vinylsulphonate (SV) and vinyl acetate (VAM), in the presence of a sulphonated copolyester obtained from:

0.524 moles of isophthalic acid, 0.348 moles of dimethyl terephthalate, 0.128 moles of the sodium salt of the dimethyl ester of 5-sulphoisophthalic acid, and 2.3 moles of ethylene glycol and exhibiting a viscosity index of 556, measured at 25° C. on a solution containing 1 g of polymer in 100 ml of a phenol/o-chlorophenol mixture in a weight ratio of 50/50, and a Tg of 29° C. at 65% RH. This sulphonated polyester of number-average molecular weight of 17,000 has a diethylene glycol content of 13% by weight.

The latex thus obtained has a proportion by weight of solids content of 42.9%, whose weight composition is as follows:

MMA 34%
EA 25.5%
MAA 7.5%
VAM 3.5%
SV 0.5%
sulphonated copolyester 29%.

The modified polymer thus obtained has a glass transition temperature Tg(A) of 55° C. and the latex has an absolute viscosity of 0.45 poises.

2) Preparation of a composite polyester film.

The latex obtained earlier is diluted by addition of distilled water to bring its solids content to 10% by weight. A latex film 4 μm in thickness is then deposited onto a 30-μm biaxially drawn polyester film by means of a Hand-Coater apparatus equipped with a No. 0 threaded bar. The coated film is then dried under tension at 120° C. for 30 s. After drying, the coating thickness is 0.5 μm.

The polyester film subjected to the coating operation was obtained by extrusion, lengthwise and then transverse drawing and then heat-setting of a polyethylene terephthalate free from filler and exhibiting a viscosity index of 650. The Ra roughness of the substrate film thus obtained is, before coating, lower than 0.01 μm. Its SRa roughness, measured as indicated above, is 0.016 μm.

3) Determination of the surface properties of the composite film

Friction coefficients

The film/metal static and dynamic friction coefficients, determined by the "shoe-shine" method described above, have the following values:

μs: 0.45

μd: 0.42

MH: 0.05 μm of the dorsal face

Abrasion resistance: excellent

Ventral face Ra <0.01 μm

Inspection of the rubbed parts by means of scanning electron microscopy demonstrated an excellent abrasion resistance of the dorsal coatings only a few infrequent wear particles were observed.

By way of comparison a composite film was prepared as in example 1 after the latex had been replaced with a latex of the same value of solids content, in which the modified polymer had the same composition of the acrylic part but in which the sulphonated copolyester content was brought back to 15% by weight. The coating of the film thus obtained has poor abrasion resistance.

EXAMPLES 2 to 5 and Comparative Test

1) Preparation of modified sulphonated polyesters.

3 modified sulphonated copolyesters differing in their composition and their glass transition temperature were prepared by operating according to the process of Example 1.

The polymerisation of the ethylenic monomers was carried out optionally in the presence of tert-dodecyl mercaptan (tDDM) as chain limiter. Five latices were obtained in this way, denoted by L1, L2, L3, L4 and L5 in what follows and containing 40.1, 39.9, 41 and 40% by weight of solids content respectively, consisting of modified copolyesters P1, P2, P3, P4 and P5 which had the composition and glass transition temperature shown in Table 1.

| REF | VAM | CAc (1) | MAA | EA | BuA (2) | MMA | SP (3) | NMMA (4) | tDDM % (6) | SE | Tg(A) °C. (5) |
|---|---|---|---|---|---|---|---|---|---|---|---|
| P1 | 0 | 0 | 2 | 0 | 22 | 56 | 20 | 0 | 0 | 40.1 | 42 |
| P2 | 0 | 0 | 2 | 0 | 42 | 36 | 20 | 0 | 0 | 39.9 | 8 |
| P4 | 0 | 0 | 2 | 0 | 32 | 46 | 20 | 0 | 0 | 40 | 20 |
| P3 | 4 | 0.6 | 8.8 | 32.4 | 0 | 39.6 | 20 | 2.4 | 0.32 | 41 | 35 |
| P5 | 0 | 0 | 1 | 0 | 15 | 64 | 20 | 0 | 0 | 40 | 60 |

(1) crotonic acid,
(2) butyl acrylate,
(3) sulphonated copolyester,
(4) N-methylolmethacrylamide employed as crosslinker,
(5) of the acrylic part
(6) % by weight relative to the total monomers 2) Preparation of a composite polyester film By operating according to the process of Example 1, composite films were prepared by depositing latices P1, P2, P3, P4 and P5, diluted beforehand to lower their solids concentrations to 10% by weight, onto the polyester film of Example 1.

After drying and in all cases the coating thickness was 0.5 μm.

The composite films thus obtained are designated CP1, CP2, CP3, CP4 and CP5 respectively.

3) Determination of surface properties

Friction coefficients

The μs and μd values determined by the "shoe-shine" method are listed in the following table:

| EX | COMPOSITE FILM | μs | μd | dorsal MH |
|---|---|---|---|---|
| 2 | CP1 | 0.45 | 0.42 | <0.04 μm |
| 3 | CP3 | 0.37 | 0.35 | " |
| 4 | CP4 | 0.5 | 0.5 | " |
| 5 | CP5 | 0.45 | 0.4 | " |
| EC1 | CP2 | 0.9 | 0.8 | " |

It is found that the friction coefficients increase with the lowering of the glass transition temperature of the acrylic part.

Abrasion resistance

Examination of the rubbed parts reveals that the composite CP2 has a very good abrasion resistance which is superior to that of the composites CP1, CP3, CP4 and CP5 even though it has high friction coefficients.

EXAMPLE 6

1) Preparation of a composite film

A reference composite film $C2P_1$ is prepared by in-line coating of an unfilmed PET film using the latex L1 deposited onto the film between the lengthwise drawing and the transverse drawing. The conditions of film manufacture are the following:

lengthwise drawing ratio: 3.4 temperature: 75° C.

transverse drawing temperature: 110°–120° C.

heat-setting: 210° C.

(The virgin film obtained under these conditions exhibits an SRa roughness of 0.016 μm and an Ra roughness of less than 0.01 μm).

The coating operation is carried out by passing the monoaxially drawn PET film between a rubber transfer roll and a rubber backing roll, the transfer roll being in contact with an engraved roll rotating in the latex L1 (Helio-Report system). The coated monoaxially drawn film then passes through a preheating zone heated to 95° C., in which drying of the coating takes place and is then drawn in the transverse direction, subjected to heat-setting and reeled up. A reeled coated film was obtained in this way without difficulty, with a total thickness of 9 μm and in which the thickness of the dorsal coating was 0.25 μm.

2) Property of the composite film C2P1

Friction coefficient:

| Film/metal | Film/film |
|---|---|
| μs 0.45; | 0.63 |
| μd 0.4; | 0.5 |
| μk 0.43; | |

Roughness: MH >0.04 μm,

Abrasion resistance: good,

Reelability: excellent.

EXAMPLE 7

Example 6 was repeated after the latex L1 was diluted by a half to bring its solids content to 20% by weight. A composite film C3P1 was obtained, in which the dorsal coating has a thickness of 0.12 μm and which has the following properties:

| Film/metal | Film/film |
|---|---|
| μs 0.42; | 0.77 |
| μd 0.4; | 0.54 |
| μk 0.4; | |

Roughness: MH<0.04 μm,

Abrasion resistance: good,

Reelability: excellent.

EXAMPLE 8 to 9

Two composite films C2P3 and C3P3 were prepared by in-line coating the PET film of Example 6, according to the process described in this example, starting with latex L3 with 40% and then 20% solids content. The composite films have the following properties:

| | Film/metal friction | | | Reel-ability | Abrasion resistance |
|---|---|---|---|---|---|
| | μs | μd | μk | | |
| C2P3 | 0.43 | 0.35 | 0.5 | good | good |
| C3P3 | 0.4 | 0.35 | 0.4 | " | " |

EXAMPLES 10 to 14

A series of composite polyester films were prepared using the process of Example 6, starting with latices L1 (20% solids content), L3 (20% solids content) and L2 (20% solids content) after variable quantities of polystyrene beads with a mean diameter of 0.15 μm had been added to them.

The composite films thus obtained have the characteristics which appear in the table below.

| | | LATEX | | FRICTION COEFFICIENTS | | | | | dorsal | |
| | | SOLIDS CONTENT | BEAD CONTENT | FILM/METAL | | | FILM/FILM | | MH | |
| EX. | REF | (in %) | % by weight | μs | μd | μk | μs | μd | μm | REELABILITY |
|---|---|---|---|---|---|---|---|---|---|---|
| 10 | L1 | 20 | 1 | 0.32 | 0.3 | 0.32 | 0.7 | 0.47 | 0.1 | very good |
| 11 | L1 | 20 | 4 | 0.32 | 0.3 | 0.3 | 0.62 | 0.43 | 0.1 | very good |
| 12 | L3 | 20 | 1 | 0.3 | 0.25 | 0.34 | 0.65 | 0.47 | 0.1 | very good |
| 13 | L3 | 20 | 4 | 0.25 | 0.2 | 0.2 | 0.56 | 0.46 | 0.1 | very good |
| 14 | L2 | 20 | 4 | 0.5 | 0.45 | 0.4 | 0.59 | 0.48 | 0.1 | very good |

EXAMPLE 15

A composite film is prepared by operating as in Example 1 after the modified polymer had been replaced with a polymer P6 of Tg(A) 40° C. crosslinked with N-methyl-methacrylamide. This polymer had the following weight composition:

MMA 53

BuA 20

MAA 2

NMMA 5

SCP 20

The latex employed had a solids content of 20% by weight.
The composite film obtained had the following properties:
film/metal μs 0.4
film/metal μd 0.4 abrasion resistance: good.

EXAMPLE 16 to 19

A series of modified polymers P7 to P10 differing in the composition of their acrylic part and their Tg(A) were prepared by operating as in Example 1. The sulphonated copolyester, which has a Tg of 30° C. at 65% RH, has the following compositions

| terephthalate units | 68.6 mol % |
| isophthalate units | 17.15 mol % |
| 5-sulphoisophthalate units | 14.25 mol % |
| ethylene glycol units | 12.3% by weight |
| diethylene glycol units | 16.52% by weight |
| triethylene glycol units | 8.5% by weight |
| tetraethylene glycol units | 3.3% by weight |

The composition and the Tg(A) of the polymers P7 to P10 appear in the following table:

| Polymers | VAM | MAA | EtA | MMA | EGdiMA (1) | SCP | Tg |
|---|---|---|---|---|---|---|---|
| P7 | 0% | 1% | 27% | 40% | 0.69% | 31% | 42 |
| P8 | 0% | 9% | 19.5% | 40% | 0.69% | 31% | 65 |
| P9 | 0% | 9% | 31.3% | 31% | 4.8% | 31% | 40 |
| P10 | 4% | 9% | 31.4% | 24% | 0.69% | 31% | 37 |

(1) Ethylene glycol dimethacrylate

By employing the in-line coating process described in Example 6, a series of composite films CP7 to CP10 were prepared by depositing onto one face of filler-free PET film of Example 6 of aqueous latex with a solids content of 20% by weight and containing 1% by weight, relative to the solids content, of ethoxylated nonylphenol (25 ethoxy units), partially sulphated and taken in the form of ammonium salt.

The composite films obtained have the properties which appear in the following table:

| EX | Films | μs | μd | μk | Ra | Abrasion resistance | Reelability |
|---|---|---|---|---|---|---|---|
| 16 | CP7 | 0.4 | 0.39 | 0.42 | <0.01 | very good | very good |
| 17 | CP8 | 0.35 | 0.32 | 0.37 | <0.01 | very good | very good |
| 18 | CP9 | 0.45 | 0.42 | 0.5 | <0.01 | very good | very good |
| 19 | CP10 | 0.45 | 0.43 | 0.5 | <0.01 | good | good |

EXAMPLE 20

A composite film was prepared by operating as in Example 1 by depositing onto one face of the filler-free PET film of Example 1 a modified polymer with Tg(A) 40° C., prepared according to the process of Example 1 from a sulphonated copolyester which has a Tg of 17° C. at 65% RH and corresponding to the following composition:

| terephthalate units | 70.25 mol % |
| isophthalate units | 17.65 mol % |
| 5-sulphoisophthalate units | 11.75 mol % |
| ethylene glycol units | 0% by weight |
| diethylene glycol units | 39% by weight |
| triethylene glycol units | 0% by weight |
| tetraethylene glycol units | 0% by weight |

The modified polymer has the following composition:

| MMA | 56% by weight |
| BuA | 22% by weight |
| MAA | 2% by weight |
| SCP | 20% by weight |

The composite film obtained has the following film/metal friction coefficients:
μs=0.5
μd=0.43
and a good abrasion resistance.

We claim:
1. An oriented polyester film comprising (1) a polyester substrate having first and second sides, (2) an outer abrasion resistant coating on said first side of said substrate that possesses a friction coefficient of 0.5 or lower and (3) a magnetic coating layer on said second side of said substrate, said film also having a surface roughness of 0.01 μm or less, and said substrate being free of inorganic particles, said outer coating comprising a modified polymer obtained by aqueous-phase radical polymerization of at least one methacrylic or acrylic monomer in the presence of a water-dispersible polyester of at least one aromatic dicarboxylic acid and at least one aliphatic diol, containing a plurality of sulfonyloxy groups of general formula:

$$(-SO_3-)_n M \quad (I)$$

in which n is equal to 1 or 2, and M denotes a hydrogen atom, an alkali or alkaline-earth metal, an ammonium cation or a quaternary ammonium cation.

2. An oriented polyester film according to claim 1, wherein said substrate comprises a polymer containing at least 80 mol % of units derived from at least one aromatic dicarboxylic acid and from ethylene glycol.

3. An oriented polyester film according to claim 2, wherein said substrate comprises a polymer containing at least 80 mol % of ethylene glycol terephthalate or ethylene glycol naphthalenedicarboxylate units.

4. An oriented polyester film according to claim 1, wherein said substrate has a thickness lower than or equal to 40 μm.

5. An oriented polyester film according to claim 1, wherein the water-dispersible polyester used is a copolyester containing a plurality of units derived from at least two dicarboxylic acids one of which contains at least one sulphonyloxy group in its molecule and a plurality of units derived from at least one aliphatic diol.

6. An oriented polyester film according to claim 5, wherein the weight of the copolyester containing sulphonyloxy groups in the modified polymer is between 5 and 60%.

7. An oriented polyester film according to claim 5, wherein the modified polymer has an acrylic part which has a glass transition temperature higher than or equal to 20° C. and a content of copolyester containing sulphonyloxy groups of at least 20% by weight.

8. An oriented polyester film according to claim 1, wherein the number of units derived from a dicarboxylic acid containing a sulphonyloxy group is from 4 to 30 per a total of 100 units derived from dicarboxylic acids.

9. An oriented polyester film according to claim 1, wherein the water-dispersible polyester is a copolyester containing a plurality of units derived from at least one unsulphonated dicarboxylic acid taken from the group of terephthalic, isophthalic and orthophthalic acids.

10. An oriented polyester film according to claim 9, wherein the water-dispersible polyester is a copolyester containing a plurality of units derived from tere- and isophthalic acids.

11. An oriented polyester film according to claim 10, wherein the water-dispersible polyester is a copolyester in which the number of terephthalate units represents from 20 to 99% of the total number of the terephthalate and isophthalate units.

12. An oriented polyester film according to claim 1, wherein the water-dispersible polyester contains a plurality of units derived from 5-sulphoisophthalic acid.

13. An oriented polyester film according to claim 1, wherein the water-dispersible polyester contains a plurality of units derived from at least one aliphatic diol taken from the group of ethylene glycol and of its oligomers of formula HO—($CH_2$—$CH_2$—O—)$_n$H in which n is an integer from 2 to 10.

14. An oriented polyester film according to claim 1, wherein the methacrylic or acrylic monomer corresponds to the general formula:

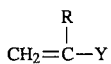
(II)

in which R denotes a hydrogen atom or a $C_1$–$C_4$ alkyl group, optionally substituted by a hydroxyl group; Y denotes a hydroxycarbonyl functional group, alkoxycarbonyl of formula —$COOR_1$ in which $R_1$ is an linear or branched alkyl radical containing from 1 to 20 carbon atoms and optionally substituted by a hydroxyl residue, nitrile, amide of formula —$CON(R_2R_3)$ in which $R_2$ and $R_3$, which are identical or different, denote a hydrogen atom or a linear or branched alkyl residue containing from 1 to 20 carbon atoms.

15. An oriented polyester film according to claim 14, wherein the methacrylic or acrylic monomer are mixtures selected from the group consisting of methyl acrylate/methacrylate, ethyl acrylate/methacrylate, acrylic/methacrylic acids, and acrylamide/methacrylamide.

16. An oriented polyester film according to claim 15, wherein one or more nonacrylic ethylenic monomers is combined with the methacrylic acrylic monomer.

17. An oriented polyester film according to claim 15, wherein at least one crosslinking monomer is combined with the monomer of formula (II).

18. An oriented polyester film according to claim 17, wherein the quantity of crosslinking monomer represents up to 5 mol % of the monomer of formula (II).

19. An oriented polyester film according to claim 17, wherein the crosslinking monomer is a ethylenic monomer.

20. An oriented polyester film according to claim 17, wherein the crosslinking monomer is a hydroxyalkyl-(meth)acrylamide.

21. An oriented polyester film according to claim 1, wherein the modified polymer contains from 0.1 to 15% by weight of at least one external crosslinking agent selected from the group consisting of phenol-formaldehyde resins and amine-formaldehyde resins.

22. An oriented polyester film according to claim 1, wherein the acrylic part of the modified polymer exhibits a glass transition temperature of between 0° to 100° C.

23. An oriented polyester film according to claim 1, wherein the modified polymer contains up to 8% by weight of substantially spherical polymeric fillers with a mean diameter of less than 0.2 μm.

24. An oriented polyester film according to claim 1, wherein the modified polymer coating layer has a thickness of between 0.55 and 1 μm.

25. An oriented polyester film according to claim 1, wherein the modified polymer comprises an acrylic part which has a glass transition temperature of less than 20° C. and contains polymeric fillers.

26. A process for making a composite polyester film according to claim 1, wherein at least one face of the oriented polyester substrate film is coated by means of an aqueous composition of modified polymer.

27. A process for making a composite film according to claim 26, wherein the modified polymer is used in the form of an aqueous dispersion.

28. A process for making a composite film according to claim 27, wherein the modified polymer is used in the form of an aqueous solution obtained by neutralizing with the aid of an alkaline base the free carboxylic acid groups present in the modified polymer of the aqueous dispersion.

29. A process for making a composite film according to claim 26, wherein the coating operation of the oriented polyester substrate film is carried out before any drawing or between two drawing operations on the substrate film.

30. A magnetic recording material comprising an oriented polyester film including a ventral face and a dorsal face, a magnetic coating applied to the ventral face and, applied on at least the dorsal face, an outer coating possessing a friction coefficient of 0.5 or less that imparts slip and abrasion resistance to the recording material, said polyester film being free from inorganic particles and having a surface roughness of 0.01 μm or less and said coating that imparts slip and abrasion resistance comprising a modified polymer obtained by aqueous phase radical polymerization of at least one acrylic monomer in the presence of a water-dispersible polyester of at least one aromatic dicarboxylic acid and at least one aliphatic diol, containing a plurality of sulphonyloxy groups of general formula:

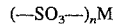
(I)

in which n is equal to 1 or 2, and M denotes a hydrogen atom, an alkali or alkaline-earth metal, an ammonium cation or a quaternary ammonium cation.

31. A magnetic recording material according to claim 30, wherein the magnetic layer is deposited by evaporation or ionic metallization and has a thickness from 0.01 to 0.2 μm.

32. A magnetic recording material according to claim 30, where said magnetic coating is an outer coating on the ventral face and the coating that imparts slip and abrasion resistance is on only one face of the polyester film.

* * * * *